United States Patent
Mandic et al.

(10) Patent No.: US 8,683,099 B1
(45) Date of Patent: Mar. 25, 2014

(54) LOAD BALANCING OF READ/WRITE ACCESSES ON A SINGLE HOST DEVICE

(75) Inventors: Vladimir Mandic, San Jose, CA (US); Michal J. Drozd, Krakow (PL)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/517,864

(22) Filed: Jun. 14, 2012

(51) Int. Cl.
*G06F 3/00* (2006.01)

(52) U.S. Cl.
USPC .......................................... 710/39; 719/313

(58) Field of Classification Search
None
See application file for complete search history.

(56) References Cited

U.S. PATENT DOCUMENTS

| | | | |
|---|---|---|---|
| 8,122,455 B2 * | 2/2012 | Paul et al. | 718/105 |
| 2001/0023463 A1 * | 9/2001 | Yamamoto et al. | 710/6 |
| 2002/0174315 A1 * | 11/2002 | Yamamoto | 711/170 |
| 2004/0177220 A1 * | 9/2004 | Yamamoto et al. | 711/114 |
| 2005/0096877 A1 * | 5/2005 | Shimazaki et al. | 702/186 |
| 2010/0036956 A1 * | 2/2010 | Nishikawa | 709/226 |

* cited by examiner

*Primary Examiner* — Elias Mamo
(74) *Attorney, Agent, or Firm* — Dergosits & Noah LLP; Todd A. Noah

(57) ABSTRACT

Methods and systems are directed to a hybrid multi-thread/multi-process model to service a large number of network requests in network storage applications and systems. The process utilizes defined parameters of target session number, maximum session number, and maximum process number to determine an optimum load balance for read/write operations of a disk access session on a single storage node. This helps to achieve higher performance when using the single node to read or write a large number of separate and parallel data streams, and represents a marked improvement over current methods that multiplex the multiple data streams or use multiple I/O processes to write each data stream.

20 Claims, 5 Drawing Sheets

300

| CONFIGURABLE PARAMETERS | |
|---|---|
| TARGET SESSIONS | 4 - Generic Disk Device<br>6 - DDBoost Device<br>maximum 60 |
| MAXIMUM SESSIONS | 32 – Generic Disk Device<br>60 – DDBoost Device<br>maximum 60 |
| MAXIMUM PROCESS COUNT | 12 – Generic Disk Device<br>14 – DDBoost Device |

*FIG. 3*

LOAD BALANCING OF READ/WRITE ACCESSES ON A SINGLE HOST DEVICE

BACKGROUND

Large-scale network environments typically involve the storage of data in one or more data stores. Present network systems often utilize storage nodes to coordinate input/output (I/O) access to central storage resources by multiple clients. In this manner, multiple and often simultaneous read/write requests from multiple clients can be synchronized and executed by a single device. In cases where a single device (e.g., storage node) must process a number of parallel data streams, it can currently do so using one of several techniques. First, a single I/O (input/output) process in which multiple data streams are multiplexed and a single stream is written. This is typically used for backup to tape or other sequential access devices, and does not fit disk-based use cases. Second, a single I/O process that writes multiple data streams in parallel by allocating time to each stream. This is typically used when multiple data streams are to be written to same target disk volume. The drawback of this method is saturation of a process with low number of streams and decreased performance as the stream count increases. This method also creates a limiting value on how many streams can be processed in parallel. Third, multiple I/O processes which each write a single data stream. This method is typically used when multiple data streams are written to separate disk volume targets. The drawback of this method is that the customer must manage a large number of disk volume targets, which imposes large overhead requirements, as well as imposes limits on the ability to access the data in timely manner. Existing methods of processing multiple parallel read/write requests in the disk storage environment thus utilize either a multi-thread model only or a multi-process model only to process a number of parallel data streams. This limited approach generally does not provide an adequate level of load balancing among multiple processes and limits the amount of concurrency available in most systems, thus reducing the efficiency and performance of these systems.

What is needed therefore is an input/output access method that provides full control on desired I/O access pattern, unlimited concurrency for all types of read or write operations, and increased I/O performance due to process load balancing. Such a method is provided by a system that implements a hybrid multi-thread and multi-process model that combines the advantageous features of each model. Although such a hybrid multi-thread/multi-process approach has been utilized in applications such as processing web requests, this approach has not been used in the network storage environments.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

FIG. 3 is a table that lists some of the configurable parameters for use in a hybrid multi-thread/multi-process model for load balancing read/write operations, under an embodiment.

DETAILED DESCRIPTION

The subject matter presented herein provides load balancing of read/write operations to a target storage device by multiple clients through a single host or network storage node. A hybrid multi-thread/multi-process model provides optimum performance and scalability of I/O processes in a disk storage environment.

Figure 1:
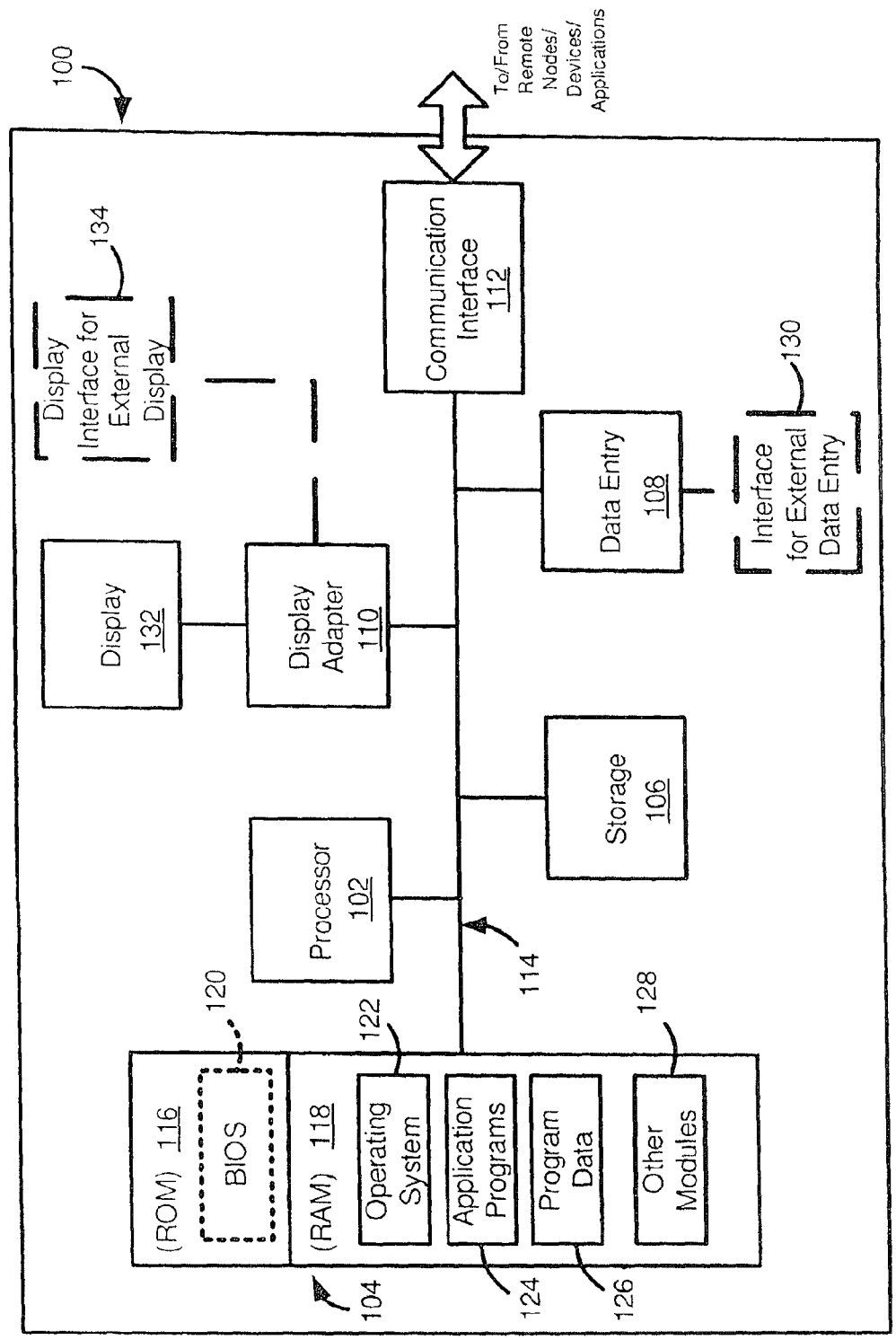
FIG. 1 is a block diagram illustrating an example hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Figure 2:
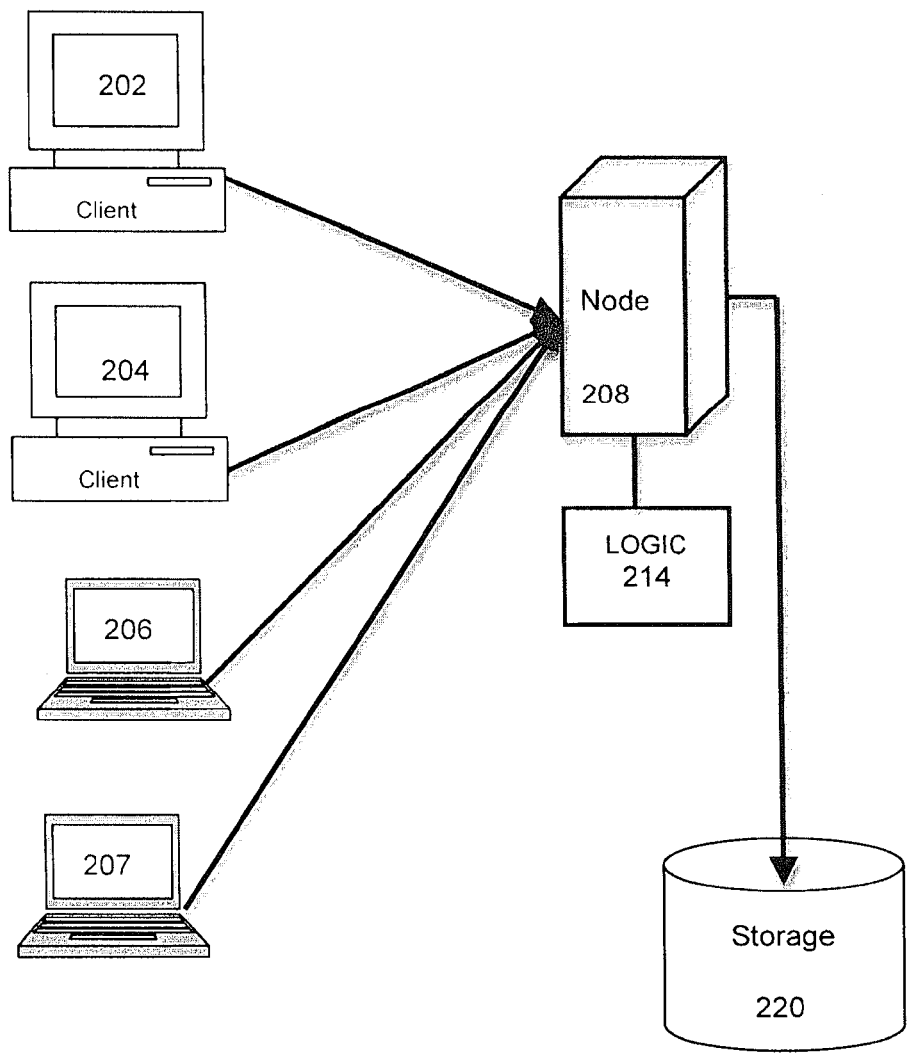
FIG. 2 illustrates an example network storage environment for performing load balancing of read/write operations through a single storage node, under an embodiment.

FIG. 2 illustrates an example network storage environment for performing load balancing of read/write operations through a single host, under an embodiment. The arrangement of components in FIG. 2 may be implemented by some or all of the components of the hardware device 100 of FIG. 1. As shown in FIG. 2, system 200 includes a number of client computers (network clients) 202-207. These network clients may be embodied in any type of appropriate computer or computing device, such as workstations, personal computers, portable computers, smartphones, personal digital assistants (PDAs), tablet computers, and any similar device. The network clients access data, such as application programs, content data, any other network resources that are stored in data storage 220. Data storage 220 is a random access storage device that may be implemented through any number of individual persistent storage devices, such as a hard drive, RAID arrays, and so on. In general, sequential storage devices, such as tape storage are not used as target storage 220 in system 200. In an embodiment, data storage element 220 appears effectively as a single storage repository to the clients in network 200, even though it may be embodied in a number of individual storage devices. In an embodiment, network 200 may represent a storage system that utilizes deduplication methods, such as the EMC Data Domain deduplication storage system. In general, deduplication systems send only deduplicated and compressed data across the network, thus requiring only a fraction of the bandwidth, time, and cost compared to traditional replication methods. A data domain storage device is typically put on a primary network so that all backup clients 202 to 207 can access the shared or batched storage 220. For isolation and security reasons, the clients of system 200 are not directly coupled to the storage 220, but rather access the storage through respective one or more storage nodes, such as storage node 208 that acts as a gateway to the storage device.

In a typical implementation, each client can only access data on the storage 220 through a specific storage node. Each client utilizes a single storage node only, while each storage node can support one or more clients. Thus, as shown in the example of FIG. 2, clients 202-207 access storage 220 through node 208. The storage node 208 has a direct interface to the storage device 220, which is shared on the network. The storage node 208 provides access to the storage 220 for its respective clients and performs read/write operations to storage 220 on behalf of these clients. It should be noted that for the example network 200 of FIG. 2, any practical number of client computers (e.g., client 202) and network storage nodes (e.g., node 208) may be supported by server 212 for control of access to storage 220. Network 200 supports different types of storage access operations including backup operations and restore or recover operations.

In an embodiment, each client typically executes one or more applications that require access to data on storage 220 through read and/or write requests. The storage node 208 executes a logic process 214 that comprises programming structures or processes to facilitate the processing of read/write requests from the clients 202-207.

The logic process 214 embodies a hybrid multi-thread/multi-process model which allows for best performance and scalability. This approach may be considered to be similar to existing applications in the web request field, such as provided by Apache MPM (multi-processing modules) Worker, or similar applications that utilize a hybrid model to service large number of web page requests, however it should be noted that this approach has not be used in the disk storage environment.

In an embodiment, system 200 represents a system, such as an EMC NetWorker system that is a suite of enterprise level data protection software that unifies and automates backup to tape, disk-based, and flash-based storage media across physical and virtual environments for granular and disaster recovery. Deduplication of backup data is provided by integration with certain Data Domain storage solutions (e.g., DD Boost). A central NetWorker server manages a datazone that contains backup clients and NetWorker storage nodes that access the backup media. A NetWorker Management Console (NMC) software, which is bundled with the NetWorker distribution, provides a user interface for functions such as client configuration, policy settings, schedules, monitoring, reports, and daily operations for deduplicated and non-deduplicated backups. The core NetWorker software backs up client file systems and operating system environment. Add-on database and application modules provide backup services for database products such as Oracle, DB2, SAP, and others. Client backup data can be sent to a remote NetWorker storage node or stored on a locally attached device by the use of a dedicated storage node.

In general, a session contains a number of process groups, that each contain a number of processes, and each process contains a number of threads. Under the logic 214, a single server broker (nsrd) makes choices on which system will service the request. The server connects with a controlling process (nsrsnmd) on the storage node to start/stop worker processes (nsrmmd). Once the process (nsrmmd) is selected and available, clients (save/recover) connect directly to it for a direct I/O path to the shared storage device. For an embodiment in which the disk storage system is implemented using the EMC NetWorker product, the worker process nsrmmd is the NetWorker media multiplexor daemon. This provides an RPC (remote procedure call) based media and multiplexing service. One nsrmmd per enabled device is started automatically by nsrd, and additional nsrmmd daemons may be started when a mount request is pending. The nsrmmd includes optional parameters using the following format:

nsrmmd [-v] [-s server] [-r system] number

The -n number option specifies the daemon number; the -s server option specifies the controlling server; the -r system parameter specifies the system that is being controlled; and the -v option prints out messages about what the daemon is doing. It should be noted that this is one example of a possible implementation of a process format and that other similar formats and process protocols may be used.

The load balancing method helps determine an optimal number of processes created for read or write requests. For example, a certain number of processes created for write requests during a backup window, with each process servicing a certain number of client sessions results in optimal write performance. Similarly, a certain number of processes created for read requests during an access window, with each process servicing a certain number of client sessions results in optimal read performance.

The logic 214 component allows a user to specify three input parameters, target sessions, maximum sessions, and maximum process count. This results in three points of control of the load balancing process. FIG. 3 is a table 300 that lists the configurable parameters used in the load balancing process in a first column of the table. The target sessions parameter is the number of sessions that should be serviced by a single process for optimal performance. In general it is inefficient to start new process for each new session, since a large number of sessions processed by single process can create a bottleneck. The maximum sessions parameter defines the overall number of sessions that can be serviced. The system may not be able to process more than specific number of sessions, and the target storage may not be able to process more than specific number of sessions. The maximum process count parameter specifies the maximum number of processes that can be started for processing. This parameter helps to avoid saturation of the system. It limits the process count in secure environments, since each process creates a connection point.

As stated above, the control logic 214 of node 208 manages certain configurable parameters, each of which can be set to any practical value depending on the constraints and capabilities of the system. Table 300 of FIG. 3 lists these parameters along with certain example default values. The default values are shown for two common applications—a storage system based on a generic disk device, and a storage system based on a Data Domain (DDboost) device. The parameters include a target sessions (TS) number, which is the number of sessions that the storage device will handle before for another available device is used. This number can be set to any practical value, depending on the application requirements and device types and constraints. For optimum performance, this number should be set to a low value. For example, the default values are four for a generic disk device, and six for a DDBoost device. Generally this value may constrained to an upper limit, such as a maximum value of 60. The maximum sessions (max sessions, MS) value sets the maximum number of sessions supported for the storage device. Again, these values may vary depending on device types and constraints. In an example implementation, this parameter has a default value of 32 for a generic disk device, and 60 for a DDBoost device. In most cases these values provide the best performance, and the maximum set value of 60 provides a built-in safety limit. The limit can be increased at any time as storage performance increases, and there may not necessarily be any hard limit in the product implementation itself. The maximum process count (max nsrmmd) parameter is an advanced setting that can be used to increase data throughput by restricting the number of backup processes that the storage node can simultaneously run. When the target or max sessions are changed, the max nsrmmd count is automatically adjusted according to the formula MS/TS+4. The default values in an example system are 12 for a generic disk device and 14 for a DDBoost device).

To avoid a single I/O pattern (for example, large number of write requests) from occupying an entire available session, the maximum process count parameter can be determined using the following equation:

Max process=(Max sessions/Target sessions)+(safety value)

For example, for typical usage of Data Domain systems using NetWorker, values are:

TargetSess=6; MaxSess=60; MaxProc=14

This results in up to ten processes created for write requests during backup window, with each process servicing six client sessions thus allowing optimal write performance. This also allows for four additional processes for other operations (replication, recovery, etc.), which may not be accounted for during normal backup. In an example implementation, the overall limit is set to 60 due to Data Domain memory requirements and number of sessions it can safely process.

Certain device configuration information for the node 208 and storage 220 devices may be stored in the system, such as in a server (not shown) coupled to the node 208. The server may store a configuration for any number of nodes and storage devices in the system 200. In this case, the logic device configuration information comprises definitions of the storage nodes and maps of which storage nodes have access to the desired target storage in order to allow the control logic to assign the preferred storage nodes to the appropriate client upon request. The organization of the configuration and the composition of the mapping information may be implemented in any manner appropriate to the application and user interface configuration. Provided below is an example presentation and format of configuration information, under an embodiment. In this example, there are three configured devices, each on different system, one on the server itself and two on additional storage nodes). As shown in the example below, all three devices point to same underlying storage. In this example, host2 is much smaller system in terms of hardware capacity, so configurable values are set lower in order to not to overload it.

type: NSR device;
name: Dev01;
comment: "Device on SN host1, data is NFS mount (example)";
device access information: "rd=host1:/data";
media type: adv_file;
enabled: Yes;
target sessions: 4;
max sessions: 32;
max nsrmmd count: 4;
type: NSR device;
name: Dev02;
comment: "Device on SN host2, data is NFS mount (example)";
device access information: "rd=host2:/data";
media type: adv_file;
enabled: Yes;
target sessions: 4;
max sessions: 8;
max nsrmmd count: 2;
type: NSR device;
name: Dev03;
comment: "Device on NW server which uses CIFS for access to data";
device access information: "\\nashost\data <file:///\\nashost\data>";
media type: adv_file;
enabled: Yes;
target sessions: 4;
max sessions: 32;
max nsrmmd count: 4;

It should be noted that the example parameter listings above illustrate only a small sub-set of full configuration values, and parameters relevant for certain embodiments are included. Other parameters may be included, as required for specific system and application implementations. Moreover, different formats and organizational structures may be employed depending upon application and user interface requirements.

Figure 4A:
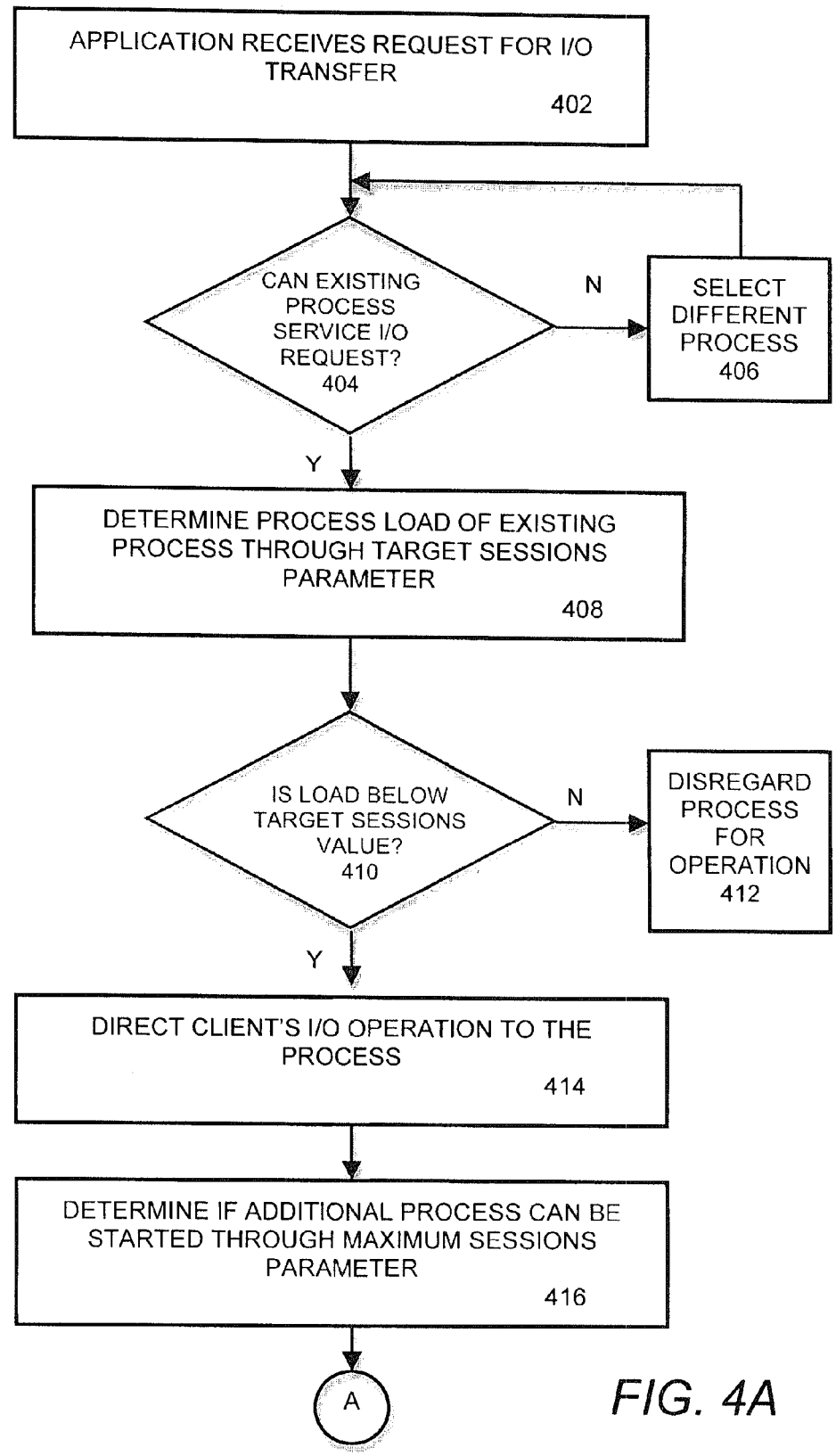
FIGS. 4A-4B illustrate a flowchart that illustrates a method of performing load balancing of parallel read/write operations using a hybrid multi-thread/multi-process model, under an embodiment.
Figure 4B:
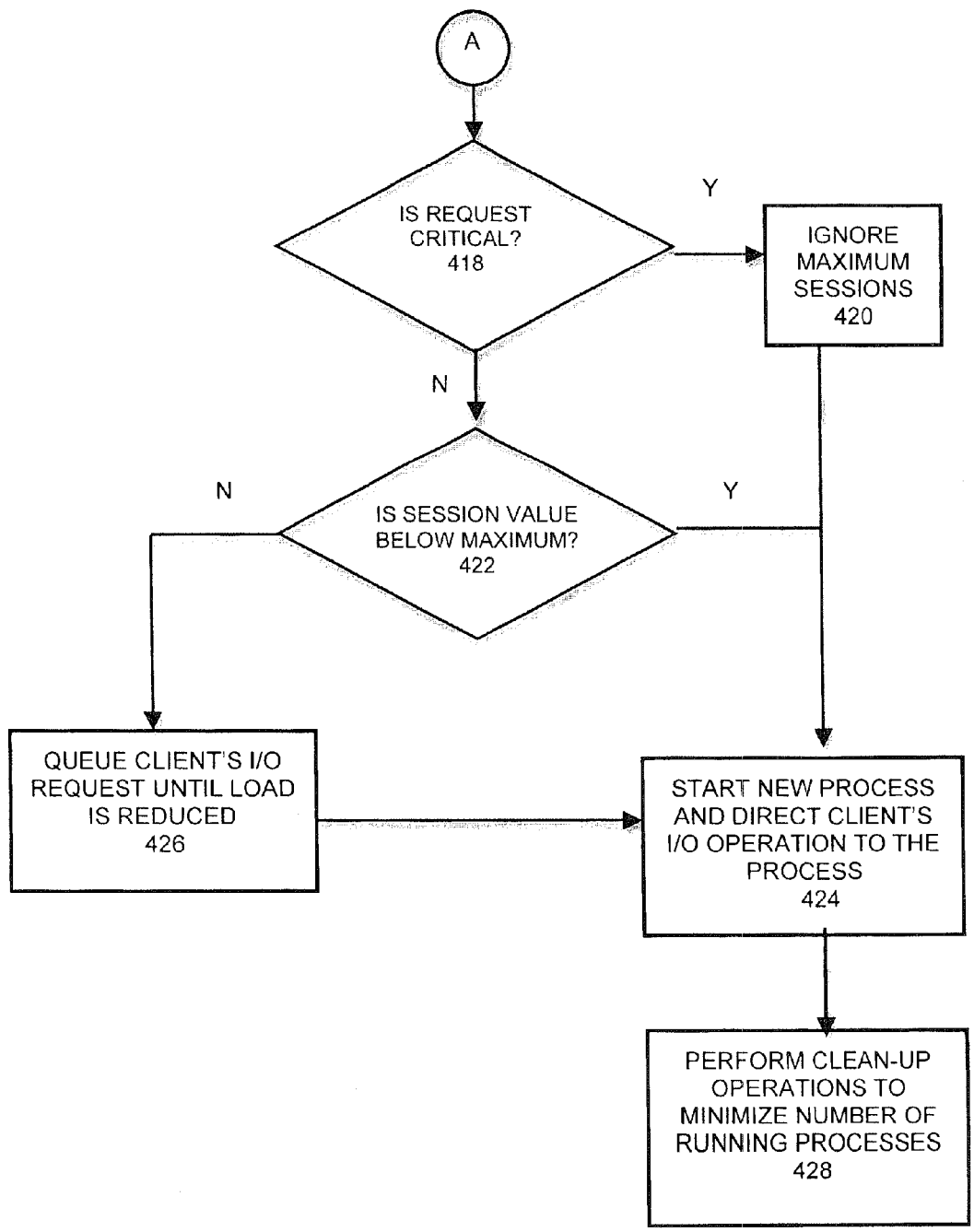

As an application receives requests for I/O transfer (read or write) for a specific device on a preferred host, it services them based on a defined workflow. FIGS. 4A-4B illustrate a flowchart 400 that illustrates a method of processing I/O transfers using a load balancing technique on a single host, under an embodiment. Process 400 begins with the application receiving the request for an I/O transfer, block 402. In block 404 it is determined whether or not any existing process can service the I/O request. This is to prevent the same process from servicing the read and write requests due to a conflicting access pattern. If the process is already serving a conflicting I/O request, it is not considered for the operation, and a different process is selected, block 406. The system next determines the process load of the existing process, using the target sessions parameter, block 408. If the process is already serving number of writes, adding one more may decrease its overall performance. As shown in table 300, the target sessions parameter is a configurable value since it depends on system and storage architecture. If the load is below the configured target sessions value as determined in block 410, the client's I/O request is directed to this process, block 414. However, if the load is already at the configured target sessions value, the process is not considered for this operation, block 412.

Once the client's I/O operation is directed to the process in block 414, the system determines whether or not an additional process be started, using the maximum sessions parameter, block 416. The host system or target storage may have limits on overall number of sessions they can process, so the application should take that into effect. This is determined by device property "Maximum Sessions", as shown in table 300.

Certain critical requests can be allowed to ignore the maximum sessions parameter. For example, critical data recover operations can be started even if a large number of existing backups are already running and thus using the maximum session count. Such operations are deemed critical to operation, and as shown in block 418, the system determines whether or not the request is critical. If the request is critical, the maximum sessions value is ignored, block 420, and the I/O operation is processed, block 424. If the request is not critical, the systems determines whether or not the aggregate value of all sessions (regardless of the process servicing them) is below the maximum sessions value and number of processes is below the maximum process count value. If so, the system starts a new process and direct the client's I/O request to it, block 424. If, in block 422 it is determined that the aggregate value of all sessions (regardless of the process servicing them) is already at the maximum sessions value or number of processes is at maximum process count value, the client's I/O request is placed into a queue until it is possible to service it, i.e., when the load is reduced to a sufficient level.

In an embodiment, the system also implements a clean-up operation to enhance efficiency. As shown in block 428 of FIG. 4B, the system performs the clean-up operation after the I/O operation is directed to the process. Any idle process (i.e., one that is not servicing any I/O requests) is stopped to minimize number of running processes. In general, the clean up operations comprise deleting idle tasks to free resources and improve efficiency. This involves checking the usage of the process and seeing if it is idle for specific amount of time. If so, the server requests the storage node to terminate the idle process, and this may be done only after specific time (e.g., one minute) to minimize the number of process start/stop requests due to slow-starting I/O requests.

The load-balancing method, and similar saturation prevention methods, and other similar safeguard and efficiency techniques may be used in storage nodes that include a dynamic volume sharing process that allows the node to be controlled by the control logic process a network server. Such dynamic volume sharing methods replace the management layer in traditional nodes, and the monolithic daemon process that is typically executed on present storage nodes. Such monolithic daemons of previous systems limited the nodes to accepting one process only at one time, thus limiting the scalability of such nodes. The dynamic volume sharing process and associated load balancing methods allows the node to scale to specific defined levels. Moreover, the load balancing methods for read/write access on a single host generally achieves much higher performance when using single host to read or write large number of data streams.

The load balance method implemented within a disk storage node represents a marked improvement over present systems in which the node simply points a client to a storage device. Each node within a system can perform its own load balancing operation to optimally and efficiently assign read/write requests to available processes. In an embodiment, the load balancing operation is performed automatically by one or more logic processes 214 executed locally within each storage node.

In an embodiment, network, 200 that implements a load balancing process may represent a multi-tenant system wherein a single instance of software runs on a server that serves multiple client organizations (tenants), each running multiple client computers. A software application is designed to virtually partition its data and configuration and each client organization works with a customized virtual application instance. The disk storage system may implement a file system that serves to organize the data that is retained after a program using the data terminates. It provides procedures to store, retrieve, and update the data, and manages the available space on the storage devices that store the data. Various different file systems may be utilized, such as VxFS (Veritas file system) and UFS (Unix file system). Below the filesystem layer could be a volume manager, such as VxVM, HPLVM or Solaris LVM which implements a form of storage virtualization. The volume manager map physical volumes or "physical extents" (e.g., hard disk partitions or logical unit numbers) of an external storage device to logical extents. These logical extents can then be manipulated in flexible ways depending on the types of disk organizations implemented in the system, such as concatenated, striped, mirror, and RAID-based disk organizations. The server assigns an appropriate device and volume in accordance with the specifics of the particular file system upon initiation of the backup process.

In an example implementation of system 200, one or more server computers may be part of a multitenant database platform including to client and storage node networked computers. The network interfaces between these computers may include one or more routers that serve to buffer and route the data transmitted among the computers. The network may be the Internet, a Wide Area Network (WAN), a Local Area Network (LAN), or any combination thereof. The server and storage node computers may be server level computers capable of supporting multiple computers or terminals, and database storage resources. The network may represent any appropriate client-server network, such as a cloud computing environment in which computing resources and storage capacity is provided as a service to a number of different clients. As stated above, an illustrative application of such an environment is a multi-tenant database system in which various elements of hardware and software of the database system may be shared by one or more customers. For example, a given application server may simultaneously process requests for a great number of customers, and a given database table may store data elements for a potentially large number of clients. In this type of environment, each of the servers may implement control logic that controls access by different clients using storage nodes that each implement a dynamic volume sharing process.

In the present disclosure, the use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer-implemented method of load balancing multiple parallel data streams initiated by read/write operations in a data storage system, the method comprising:
    defining a plurality of parameters setting default limits on sessions and processes of the read/write operations
    determining whether or not an existing process can service an input/output request of a read/write operation;
    determining a process load of the existing process using a first parameter of the plurality of parameters;
    determining if an additional process can be started at a present time using a second parameter of the plurality of parameters; and
    starting the additional process as a new process and directing the input/output request to the new process if it is determined that the additional process can be started at the present time.

2. The method of claim 1 wherein the plurality of parameters comprises:
    a target sessions parameter defining a maximum number of sessions to be serviced by a single process;
    a maximum sessions parameter defining an overall number of sessions that can be serviced; and
    a maximum process count parameter defining a maximum number of processes that can be started.

3. The method of claim 2 wherein the first parameter comprises the target sessions parameter and the second parameter comprises the maximum sessions parameter.

4. The method of claim 3 further comprising queuing the input/output request until it is possible for it to be serviced by the additional process if it is determined that the additional process cannot be started at the present time.

5. The method of claim 4 further comprising:
    determining if the input/output request is a critical request; and
    directing the input/output request to the new process even if it is determined that the additional process cannot be started at the present time by disregarding the second parameter of the plurality of parameters.

6. The method of claim 5 further comprising executing, upon completion of an operation specified by the input/output request, a clean up routine comprising:
    determining usage of a client process of the operation;
    determining whether the client process has been idle for a defined amount of time; and
    causing the client process to terminate if the client process has been idle for at least the defined amount of time.

7. The method of claim 2 wherein the data storage system comprises a plurality of client computers performing individual read/write operations to a shared storage device through a storage node, and wherein the shared storage device comprises a random access disk storage device or array.

8. The method of claim 7 wherein the shared storage device is of a type comprising one of a generic disk device and a data domain device implemented in a data domain deduplication storage system.

9. The method of claim 8 further comprising defining a default value to each parameter of the plurality of parameters based on the type of the shared storage device.

10. A system for balancing the load of multiple parallel data streams initiated by read/write operations in a data storage environment the system comprising:
    at least one storage node coupled to at least one storage device via a network;
    a processor-based application executed on the at least one storage node and configured to:
    determine a storage device to service an input/output request of a read/write operation requested by a client computer;
    start and stop worker processes for direct client computer connection through an input/output path to the storage device; and
    determine whether an existing process can service an input/output request of a read/write operation;
    determine a process load of the existing process;
    determine if an additional process can be started at a present time; and
    start the additional process as a new process and directing the input/output request to the new process if it is determined that the additional process can be started at the present time.

11. The system of claim 10 wherein the at least one storage node is further configured to define a plurality of parameters setting default limits on sessions and processes of the read/write operations, wherein a first parameter of the plurality of parameters determines the process load of the existing process, and a second parameter of the plurality of parameters determines if an additional process can be started at a present time using a second parameter of the plurality of parameters.

12. The system of claim 11 wherein the at least one storage node is associated with a graphical user interface configured to facilitate inputting values for each of the plurality of parameters by a user in the data storage environment.

13. The system of claim 12 wherein the plurality of parameters comprises:

a target sessions parameter defining a maximum number of sessions to be serviced by a single process;

a maximum sessions parameter defining an overall number of sessions that can be serviced; and a maximum process count parameter defining a maximum number of processes that can be started.

14. The system of claim 13 wherein the first parameter comprises the target sessions parameter and the second parameter comprises the maximum sessions parameter.

15. The system of claim 14 wherein the at least one storage device comprises a random access disk storage device or array, and wherein the at least one storage device is of a type comprising one of a generic disk device and a data domain device implemented in a data domain deduplication storage system.

16. The system of claim 15 wherein the at least one storage device is a shared storage device, and wherein a default value is assigned to each parameter of the plurality of parameters based on the type of the shared storage device.

17. A computer program product, comprising a non-transitory computer-readable medium having a computer-readable program code embodied therein to be executed by one or more processors, the program code including instructions to:

define a plurality of parameters setting default limits on sessions and processes of the read/write operations determine whether or not an existing process can service an input/output request of a read/write operation;

determine a process load of the existing process using a first parameter of the plurality of parameters;

determine if an additional process can be started at a present time using a second parameter of the plurality of parameters; and start the additional process as a new process and directing the input/output request to the new process if it is determined that the additional process can be started at the present time.

18. The computer program product of claim 17 wherein the plurality of parameters comprises:

a target sessions parameter defining a maximum number of sessions to be serviced by a single process;

a maximum sessions parameter defining an overall number of sessions that can be serviced; and a maximum process count parameter defining a maximum number of processes that can be started.

19. The computer program product of claim 18 wherein the first parameter comprises the target sessions parameter and the second parameter comprises the maximum sessions parameter.

20. The computer program product of claim 19, wherein the program code includes further instructions to queue the input/output request until it is possible for it to be serviced by the additional process if it is determined that the additional process cannot be started at the present time.

\* \* \* \* \*